United States Patent
Kannappan et al.

(10) Patent No.: US 10,178,473 B2
(45) Date of Patent: Jan. 8, 2019

(54) COLLECTION AND ANALYSIS OF MUTED AUDIO

(71) Applicant: Plantronics, Inc., Santa Cruz, CA (US)

(72) Inventors: Ken Kannappan, Palo Alto, CA (US); Douglas K Rosener, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 63 days.

(21) Appl. No.: 14/478,885

(22) Filed: Sep. 5, 2014

(65) Prior Publication Data

US 2016/0073185 A1    Mar. 10, 2016

(51) Int. Cl.
*H04R 3/00* (2006.01)
*H04R 1/04* (2006.01)
*G06F 3/16* (2006.01)

(52) U.S. Cl.
CPC .............. *H04R 3/00* (2013.01); *G06F 3/165* (2013.01); *H04R 1/04* (2013.01)

(58) Field of Classification Search
CPC .... H04R 3/00; H04R 1/04; H04R 3/04; G06F 3/165; H04M 3/4286; H04M 3/569; H04L 12/282; H04L 12/1827; G10L 25/78; G06L 25/78
USPC ......... 381/80; 704/210; 715/727; 379/202.1; 370/260
See application file for complete search history.

(56) References Cited

U.S. PATENT DOCUMENTS

| | | | | |
|---|---|---|---|---|
| 4,356,509 A | * | 10/1982 | Skerlos | H04M 1/56 348/552 |
| 4,517,561 A | * | 5/1985 | Burke | H04W 84/00 340/7.21 |
| 4,590,473 A | * | 5/1986 | Burke | H04W 88/026 340/7.22 |
| 4,591,851 A | * | 5/1986 | Noble | G06K 13/0825 340/3.21 |
| 4,594,591 A | * | 6/1986 | Burke | G06K 13/0825 340/3.71 |
| 4,636,791 A | * | 1/1987 | Burke | G06K 13/0825 340/7.22 |
| 5,318,340 A | * | 6/1994 | Henry | A47C 15/00 297/217.3 |
| 5,884,247 A | * | 3/1999 | Christy | G06F 17/2872 704/4 |
| 6,275,806 B1 | * | 8/2001 | Pertrushin | G10L 17/26 704/270 |

(Continued)

FOREIGN PATENT DOCUMENTS

WO    WO 2007/080517 A2    7/2007

OTHER PUBLICATIONS

HDLC—A Technical Overview, Jan. 4, 2103 http://vkalra.tripod.com/hdlc.html.*

(Continued)

*Primary Examiner* — Yogeshkumar Patel

(57) ABSTRACT

Apparatus having corresponding methods comprise a microphone configured to produce audio; a mute control configured to select a microphone open selection or a microphone muted selection; a processor configured to identify the audio produced during the microphone open selection as primary audio, and to identify the audio produced during the microphone muted selection as secondary audio; and a transceiver configured to transmit the primary audio and the secondary audio.

19 Claims, 6 Drawing Sheets

(56) References Cited

U.S. PATENT DOCUMENTS

| | | | | |
|---|---|---|---|---|
| 6,681,020 B1* | 1/2004 | Papopoulos | | H04R 3/00 |
| | | | | 381/111 |
| 6,757,361 B2 | 6/2004 | Blair et al. | | |
| 6,987,846 B1* | 1/2006 | James | | H04M 3/51 |
| | | | | 379/201.06 |
| 8,126,136 B2* | 2/2012 | Tong | | G10L 25/00 |
| | | | | 379/265.02 |
| 8,390,670 B1* | 3/2013 | Gottlieb | | H04N 7/15 |
| | | | | 348/14.12 |
| 8,693,644 B1* | 4/2014 | Hodges, Jr. | | H04M 3/5175 |
| | | | | 379/265.06 |
| 8,861,744 B1* | 10/2014 | Solomon | | H04R 1/02 |
| | | | | 381/80 |
| 8,903,721 B1* | 12/2014 | Cowan | | H04R 3/005 |
| | | | | 704/206 |
| 9,167,095 B1* | 10/2015 | Selvin | | H04M 3/5175 |
| 9,225,833 B1* | 12/2015 | Koster | | H04M 3/5175 |
| 2001/0056349 A1* | 12/2001 | St. John | | G07C 9/00158 |
| | | | | 704/270 |
| 2002/0002460 A1* | 1/2002 | Pertrushin | | G10L 17/26 |
| | | | | 704/270 |
| 2002/0002464 A1* | 1/2002 | Petrushin | | G10L 17/26 |
| | | | | 704/275 |
| 2002/0010587 A1* | 1/2002 | Pertrushin | | G10L 17/26 |
| | | | | 704/275 |
| 2003/0023444 A1* | 1/2003 | St. John | | H04M 3/382 |
| | | | | 704/270.1 |
| 2003/0031327 A1 | 2/2003 | Bakis et al. | | |
| 2004/0172252 A1 | 9/2004 | Aoki et al. | | |
| 2004/0203730 A1* | 10/2004 | Fraser | | H04W 76/20 |
| | | | | 455/426.1 |
| 2004/0249650 A1* | 12/2004 | Freedman | | G06Q 30/02 |
| | | | | 705/7.29 |
| 2005/0027539 A1* | 2/2005 | Weber | | G08C 17/00 |
| | | | | 704/275 |
| 2005/0288067 A1* | 12/2005 | Wainwright | | H04M 19/04 |
| | | | | 455/567 |
| 2007/0121824 A1 | 5/2007 | Agapi et al. | | |
| 2008/0013747 A1 | 1/2008 | Tran | | |
| 2008/0107255 A1* | 5/2008 | Geva | | H04M 3/51 |
| | | | | 379/265.06 |
| 2008/0167878 A1 | 7/2008 | Hause et al. | | |
| 2008/0219243 A1* | 9/2008 | Silverman | | H04L 41/5038 |
| | | | | 370/352 |
| 2008/0219429 A1* | 9/2008 | Mandalia | | H04M 3/5175 |
| | | | | 379/266.02 |
| 2008/0260169 A1 | 10/2008 | Reuss | | |
| 2008/0318518 A1* | 12/2008 | Coutinho | | H04H 20/62 |
| | | | | 455/3.06 |
| 2009/0013085 A1* | 1/2009 | Liberman Ben-Ami | | |
| | | | | G06Q 10/06 |
| | | | | 709/230 |
| 2009/0292541 A1 | 11/2009 | Daya et al. | | |
| 2010/0020982 A1* | 1/2010 | Brown | | H04R 1/1041 |
| | | | | 381/74 |
| 2010/0020998 A1* | 1/2010 | Brown | | H04R 1/1041 |
| | | | | 381/380 |
| 2010/0057444 A1* | 3/2010 | Cilia | | G10L 19/012 |
| | | | | 704/201 |
| 2010/0182507 A1* | 7/2010 | Haggis | | G01D 7/005 |
| | | | | 348/570 |
| 2010/0310095 A1* | 12/2010 | Nakao | | G06F 3/165 |
| | | | | 381/109 |
| 2010/0324891 A1* | 12/2010 | Cutler | | G10L 25/78 |
| | | | | 704/210 |
| 2011/0028136 A1 | 2/2011 | Frazier et al. | | |
| 2011/0208522 A1 | 8/2011 | Pereg et al. | | |
| 2011/0211625 A1* | 9/2011 | Birmingham | | H04M 11/066 |
| | | | | 375/222 |
| 2011/0300909 A1* | 12/2011 | Namima | | H04M 1/72519 |
| | | | | 455/566 |
| 2012/0020348 A1 | 1/2012 | Haverinen et al. | | |
| 2012/0027228 A1* | 2/2012 | Rijken | | H04H 60/04 |
| | | | | 381/119 |
| 2012/0050032 A1* | 3/2012 | Hough | | G06F 3/0416 |
| | | | | 340/539.13 |
| 2012/0296642 A1 | 11/2012 | Shammass et al. | | |
| 2013/0028399 A1 | 1/2013 | Kopparapu et al. | | |
| 2013/0050199 A1* | 2/2013 | Chavez | | G06Q 10/101 |
| | | | | 345/419 |
| 2013/0051543 A1* | 2/2013 | McDysan | | H04M 3/4286 |
| | | | | 379/202.01 |
| 2013/0067050 A1* | 3/2013 | Kotteri | | H04L 65/60 |
| | | | | 709/223 |
| 2013/0096926 A1* | 4/2013 | Maling, III | | H04L 12/282 |
| | | | | 704/500 |
| 2013/0097510 A1* | 4/2013 | Maling, III | | H04L 12/282 |
| | | | | 715/727 |
| 2013/0106985 A1* | 5/2013 | Tandon | | H04L 12/1827 |
| | | | | 348/14.08 |
| 2013/0208881 A1 | 8/2013 | Pande et al. | | |
| 2013/0211567 A1 | 8/2013 | Oganesyan et al. | | |
| 2014/0093091 A1 | 4/2014 | Dusan et al. | | |
| 2014/0094151 A1* | 4/2014 | Klappert | | H04M 1/6083 |
| | | | | 455/414.1 |
| 2014/0140497 A1* | 5/2014 | Ripa | | H04M 3/5133 |
| | | | | 379/265.06 |
| 2014/0168135 A1* | 6/2014 | Saukko | | G06F 1/1684 |
| | | | | 345/174 |
| 2014/0192970 A1* | 7/2014 | Castellani | | G06Q 10/06398 |
| | | | | 379/265.06 |
| 2014/0233720 A1* | 8/2014 | Ye | | H04M 3/5175 |
| | | | | 379/265.06 |
| 2014/0280879 A1* | 9/2014 | Skolicki | | H04L 67/22 |
| | | | | 709/224 |
| 2015/0085064 A1* | 3/2015 | Sanaullah | | H04M 3/568 |
| | | | | 348/14.08 |
| 2015/0092930 A1* | 4/2015 | Mullen | | H04M 3/4936 |
| | | | | 379/88.01 |
| 2015/0139043 A1* | 5/2015 | Grevers, Jr. | | H04L 12/1822 |
| | | | | 370/260 |
| 2015/0146715 A1* | 5/2015 | Olivier | | H04L 65/1016 |
| | | | | 370/352 |
| 2015/0156598 A1* | 6/2015 | Sun | | H04L 12/1822 |
| | | | | 348/14.07 |
| 2015/0189438 A1* | 7/2015 | Hampiholi | | G06F 3/165 |
| | | | | 381/80 |
| 2015/0195411 A1* | 7/2015 | Krack | | H04M 3/569 |
| | | | | 379/202.01 |
| 2015/0310877 A1 | 10/2015 | Onishi et al. | | |
| 2015/0350418 A1* | 12/2015 | Rauenbuehler | | H04L 63/0823 |
| | | | | 455/414.1 |
| 2015/0371652 A1 | 12/2015 | Ewer et al. | | |
| 2016/0110659 A1* | 4/2016 | Skeen | | G06Q 10/02 |
| | | | | 705/5 |

OTHER PUBLICATIONS

Unknown, "Speech Analytics, Innovative Speech Technologies to Unveil Hidden Insights," found at URL http://www.nice.com/speech-analytics, on Sep. 11, 2014.

International Search Report and Written Opinion dated Oct. 5, 2015, for PCT Application No. PCT/US2015/033603.

Pallotta et al., "Interaction Mining: the New Frontier of Call Center Analytics," found at URL http://www.researchgate.net/profile/Vincenzo_Pallotta/publication/265145028_Interaction_Mining_the_new_frontier_of_Call_Center_Analytics/links/542beb900cf27e39fa9lbea2.pdf, Jan. 1, 2011.

Pandharipande et al., "A Language Independent Approach to Identify Problematic Conversation in Call Centers," ECTI Transactions on Computer and Information Technology, 7(2):146-155.

* cited by examiner

COLLECTION AND ANALYSIS OF MUTED AUDIO

FIELD

The present disclosure relates generally to the field of audio processing. More particularly, the present disclosure relates to analysis of audio generated by a microphone.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Currently most audio communication systems have a mute function controlled locally that prevents the remote party from hearing the local audio. When the mute function is active, audio generated by the microphone is not transmitted to the remote party.

In call centers, there are several reasons an agent may mute his microphone. The agent may be coughing or sneezing, and does not want the remote party to hear. The agent may be having difficulty handling a call, and so is asking questions of his co-workers. Or the agent may be doing things not related to his work.

In each of these examples, the behavior of the agent may indicate a problem. An ill agent may spread illness to others in the call center. An agent asking questions of his co-workers may need more training, or may have competency issues. Or an agent may not be providing the work desired.

Currently, these problems are generally detected by a supervisor observing the agents directly. This process costs time and resources that could be directed to more productive endeavors. An agent may be observed remotely by monitoring his calls, but such monitoring fails while the mute function is active.

SUMMARY

In general, in one aspect, an embodiment features an apparatus comprising: a microphone configured to produce audio; a mute control configured to select a microphone open selection or a microphone muted selection; a processor configured to identify the audio produced during the microphone open selection as primary audio, and to identify the audio produced during the microphone muted selection as secondary audio; and a transceiver configured to transmit the primary audio and the secondary audio.

Embodiments of the apparatus can include one or more of the following features. In some embodiments, the transceiver is further configured to transmit the primary audio over a first link, and to transmit the secondary audio over a second link. In some embodiments, the first link is an audio link; and the second link is a data link. In some embodiments, the first link is a Bluetooth Synchronous Connection Oriented (SCO) link; and the secondary link is a Bluetooth Asynchronous Connection-Less (ACL) link. In some embodiments, the transceiver comprises: a first transceiver configured to transmit the primary audio according to a first protocol; and a second transceiver configured to transmit the secondary audio according to a second protocol. Some embodiments comprise a memory configured to store the secondary audio prior to the transceiver transmitting the secondary audio. In some embodiments, the processor is further configured to packetize the primary audio and the secondary audio, and to mark at least one of (i) packets of the primary audio and (ii) packets of the secondary audio. Some embodiments comprise a headset.

In general, in one aspect, an embodiment features a method comprising: producing audio responsive to sound; determining a selection of a mute control configured to select a microphone open selection or a microphone muted selection; identifying the audio produced during the microphone open selection as primary audio; identifying the audio produced during the microphone muted selection as secondary audio; and transmitting the primary audio and the secondary audio.

Embodiments of the method can include one or more of the following features. Some embodiments comprise transmitting the primary audio over a first link; and transmitting the secondary audio over a second link. Some embodiments comprise transmitting the primary audio according to a first protocol; and transmitting the secondary audio according to a second protocol. Some embodiments comprise packetizing the primary audio and the secondary audio; and marking at least one of (i) packets of the primary audio and (ii) packets of the secondary audio.

In general, in one aspect, an embodiment features apparatus comprising: a receiver configured to receive audio produced by a headset, wherein the headset has a mute control configured to select a microphone open selection or a microphone muted selection, and wherein the audio includes primary audio and secondary audio, wherein the primary audio is generated by a microphone of the headset during a microphone open selection, and wherein the secondary audio is generated by the microphone of the headset during the microphone muted selection; and a switch configured to pass the primary audio to a communications channel, and to pass the secondary audio to an analytics engine.

Embodiments of the apparatus can include one or more of the following features. In some embodiments, the switch is further configured to pass the primary audio to the analytics engine. Some embodiments comprise the analytics engine. In some embodiments, the receiver is further configured to receive the primary audio over a first link, and to receive the secondary audio over a second link. In some embodiments, the first link is an audio link; and the secondary link is a data link. In some embodiments, the first link is a Bluetooth Synchronous Connection Oriented (SCO) link; and the secondary link is a Bluetooth Asynchronous Connection-Less (ACL) link. In some embodiments, the receiver comprises: a first receiver configured to receive the primary audio according to a first protocol; and a second receiver configured to receive the secondary audio according to a second protocol. In some embodiments, the audio comprises packets of the primary audio and packets of the secondary audio; at least one of (i) the packets of the primary audio and (ii) the packets of the secondary audio include marks; and the switch is further configured to distinguish the (i) the packets of the primary audio and (ii) the packets of the secondary audio based on the marks.

The details of one or more implementations are set forth in the accompanying drawings and the description below. Other features will be apparent from the description and drawings, and from the claims.

Figure 1:
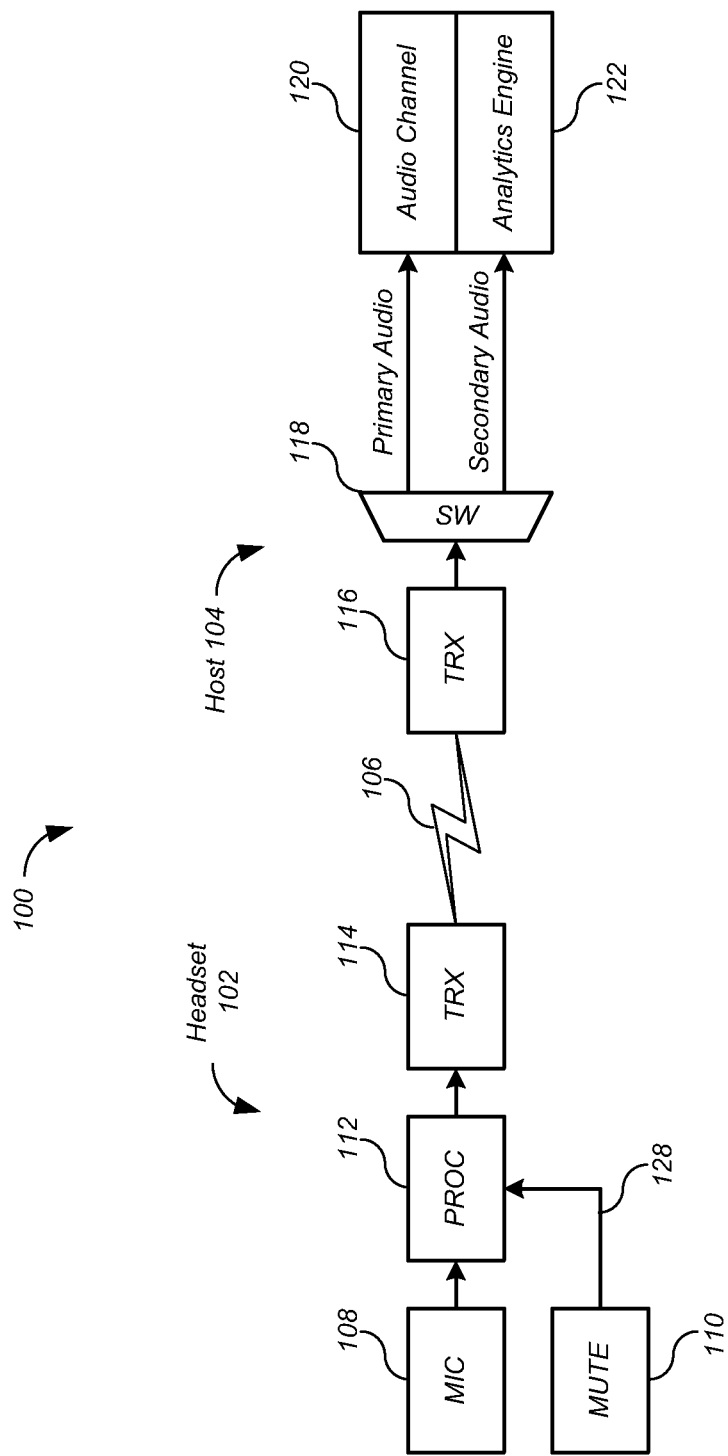
FIG. 1 shows elements of a call center audio system according to an embodiment where the primary and secondary audio are distinguished using packet marking.

The leading digit(s) of each reference numeral used in this specification indicates the number of the drawing in which the reference numeral first appears.

DETAILED DESCRIPTION

Embodiments of the present disclosure provides collection of muted audio for analysis and the like. In the described embodiments, sound received by a microphone while the microphone is muted (that is, the mute function is active) is collected and analyzed. Sound received by the microphone while not muted (that is, while the mute function is not active) may be analyzed as well. Audio collected while the microphone is not muted is referred to herein as "primary audio." Audio collected while the microphone is muted is referred to herein as "secondary audio." In the described embodiments, various techniques are employed to distinguish the primary audio from the secondary audio. In some embodiments, packets of the primary audio and/or secondary audio may be marked, for example by setting flags in headers of the packets. In other embodiments, the primary audio and secondary audio may be transmitted over different links, using different protocols, and the like. Other features are contemplated as well.

Embodiments of the present disclosure are described in terms of an agent wearing a wireless headset in a call center. However, the techniques described herein are applicable to any audio device having a microphone, and in any environment.

FIG. 1 shows elements of a call center audio system 100 according to an embodiment where the primary and secondary audio are distinguished using packet marking. Although in the described embodiment elements of the call center audio system 100 are presented in one arrangement, other embodiments may feature other arrangements. For example, elements of the call center audio system 100 may be implemented in hardware, software, or combinations thereof. As another example, various elements of the call center audio system 100 may be implemented as one or more digital signal processors.

Referring to FIG. 1, the call center audio system 100 may include a headset 102 in communication with a host 104 over a wireless channel 106. The headset 102 may include a microphone (MIC) 108, a mute control (MUTE) 110, a processor (PROC) 112, and a transceiver (TRX) 114. The host 104 may include a transceiver (TRX) 116, a switch (SW) 118, an audio channel 120, and an analytics engine 122. While in the described embodiments, the analytics engine 122 may be part of the host 104, in other embodiments, the analytics engine 122 may not be part of the host 104, and may be located outside the call center audio system 100.

The mute control 110 may select either a microphone open selection or a microphone muted selection. The mute control 110 may be user-operable, automatic, or both. A user-operable mute control 110 may be implemented as a button, slide switch, or the like. An automatic mute control 110 may automatically select the microphone open selection when donned, and may automatically select the microphone muted selection when doffed.

The processor 112 may include an analog-to-digital converter, a digital signal processor, a packetizer, and the like. The wireless channel 106 may be a Bluetooth channel, a Digital Enhanced Cordless Telecommunications (DECT) channel, a Wi-Fi channel, or the like. The audio channel 120 may be any audio channel suitable for passing packets of primary audio to a remote party. The secondary audio may be routed directly to the host 104, or via another device such as a smart phone or computer.

Figure 2:
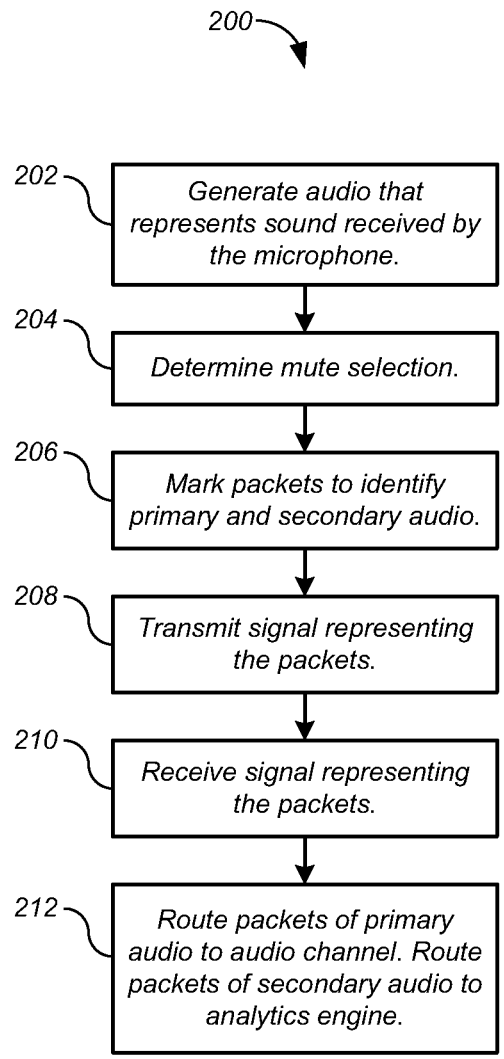
FIG. 2 shows a process for the call center audio system of FIG. 1 according to one embodiment.

FIG. 2 shows a process 200 for the call center audio system 100 of FIG. 1 according to one embodiment. Although in the described embodiments the elements of process 200 are presented in one arrangement, other embodiments may feature other arrangements. For example, in various embodiments, some or all of the elements of process 200 can be executed in a different order, concurrently, and the like. Also some elements of process 200 may not be performed, and may not be executed immediately after each other. In addition, some or all of the elements of process 200 can be performed automatically, that is, without human intervention.

Referring to FIG. 2, at 202, the microphone 108 may generate audio that represents sound received by the microphone 108. The processor 112 may process the audio. An analog-to-digital converter within the processor may convert the audio to digital audio. The processor 112 may packetize the digital audio. The mute control 110 may be operated by the agent to select either a microphone open selection or a microphone muted selection. The selection may be communicated to the processor 112 by a mute signal 128. At 204, the processor 112 may determine the selection based on the mute signal 128.

The processor 112 may identify the audio produced during the microphone open selection as primary audio, and may identify the audio produced during the microphone muted selection as secondary audio. In the present embodiment, at 206, the processor 112 may identify the audio by marking some or all of the packets in the audio stream. The processor 112 may mark the packets in accordance with the mute signal 128. The processor 112 may mark the packets of the digital audio when the mute signal 128 indicates the microphone muted selection, when the mute signal 128 indicates the microphone open selection, or both. The processor 112 may mark the packets, for example, by setting or clearing a flag in the header of each packet, or in the header of a packet to indicate a transition between blocks of secondary and primary audio, and the like. The processor 112 may insert control packets transition between blocks of secondary and primary audio, and the like. At 208, the transceiver 114 of the headset 102 may transmit a signal representing the packets over the wireless channel 106.

At 210, the transceiver 116 of the host 104 may receive the signal representing the packets over the wireless channel 106. At 212, the switch 118 routes the packets according to the marks in the packets. In particular, the switch 118 routes the packets of primary audio to the audio channel 120, and routes the packets of secondary audio to the analytics engine 122 for analysis. In some embodiments, the switch 118 may also route some or all of the packets of primary audio to the analytics engine 122 for analysis.

Figure 3:
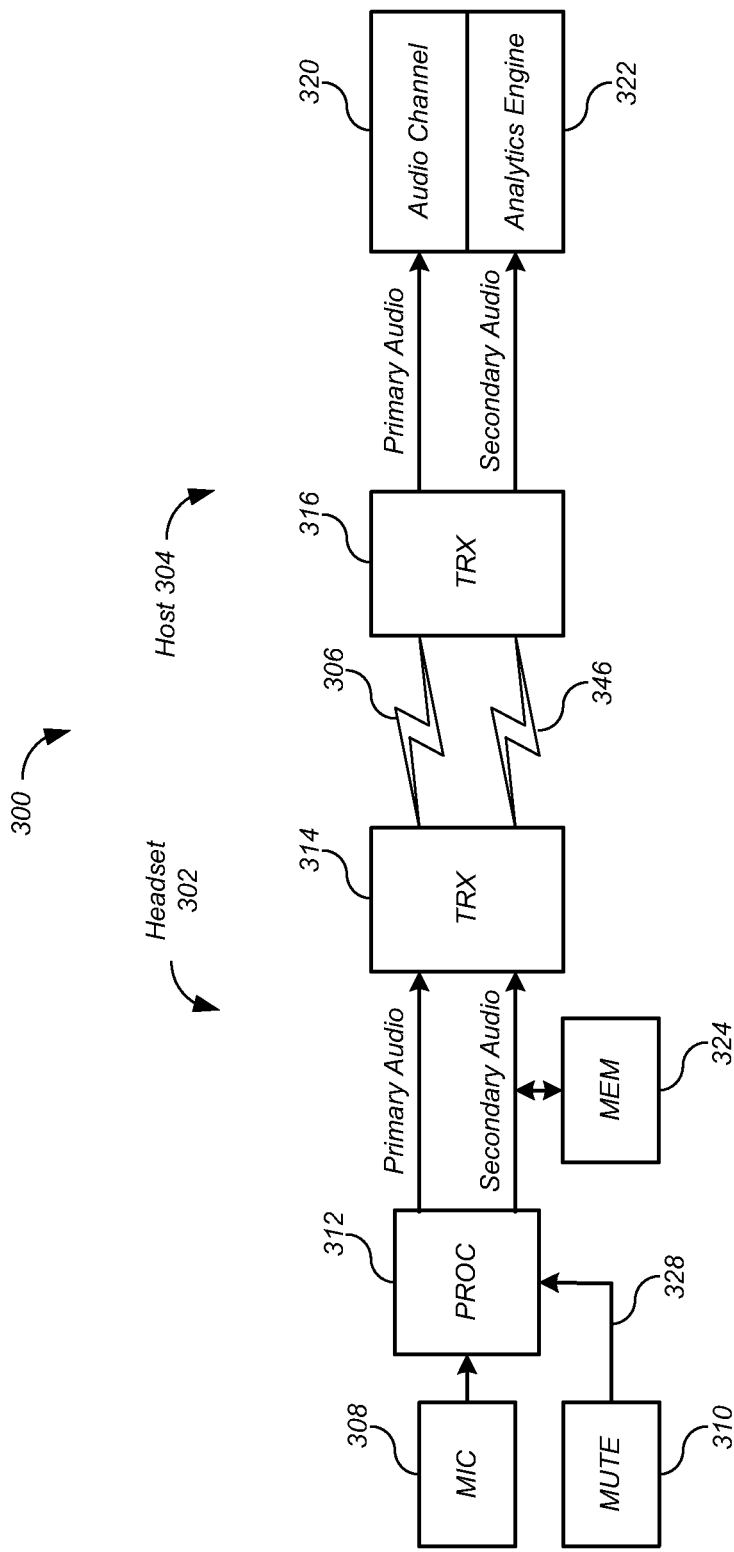
FIG. 3 shows elements of a call center audio system according to an embodiment where the primary and secondary audio are distinguished using different communication links.

FIG. 3 shows elements of a call center audio system 300 according to an embodiment where the primary and secondary audio are distinguished using different communication links. Although in the described embodiment elements of the call center audio system 300 are presented in one arrangement, other embodiments may feature other arrangements. For example, elements of the call center audio system 300 may be implemented in hardware, software, or combinations thereof. As another example, various elements of the call center audio system 300 may be implemented as one or more digital signal processors.

Referring to FIG. 3, the call center audio system 300 may include a headset 302 in communication with a host 304 over a wireless channel 306. The headset 302 may include a microphone (MIC) 308, a mute control (MUTE) 310, a processor (PROC) 312, a memory 324, and a transceiver (TRX) 314. The host 304 may include a transceiver (TRX) 316, an audio channel 320, and an analytics engine 322. While in the described embodiments, the analytics engine 322 may be part of the host 304, in other embodiments, the analytics engine 322 may not be part of the host 304, and may be located outside the call center audio system 300.

The mute control 310 may select either a microphone open selection or a microphone muted selection. The mute control 310 may be user-operable, automatic, or both. A user-operable mute control 310 may be implemented as a button, slide switch, or the like. An automatic mute control 310 may automatically select the microphone open selection when donned, and may automatically select the microphone muted selection when doffed.

The processor 312 may include an analog-to-digital converter, a digital signal processor, a packetizer, and the like. The wireless channel 306 may be a Bluetooth channel, a Digital Enhanced Cordless Telecommunications (DECT) channel, a Wi-Fi channel, or the like. The audio channel 320 may be any audio channel suitable for passing packets of primary audio to a remote party. The secondary audio may be routed directly to the host 304, or via another device such as a smart phone or computer.

Figure 4:
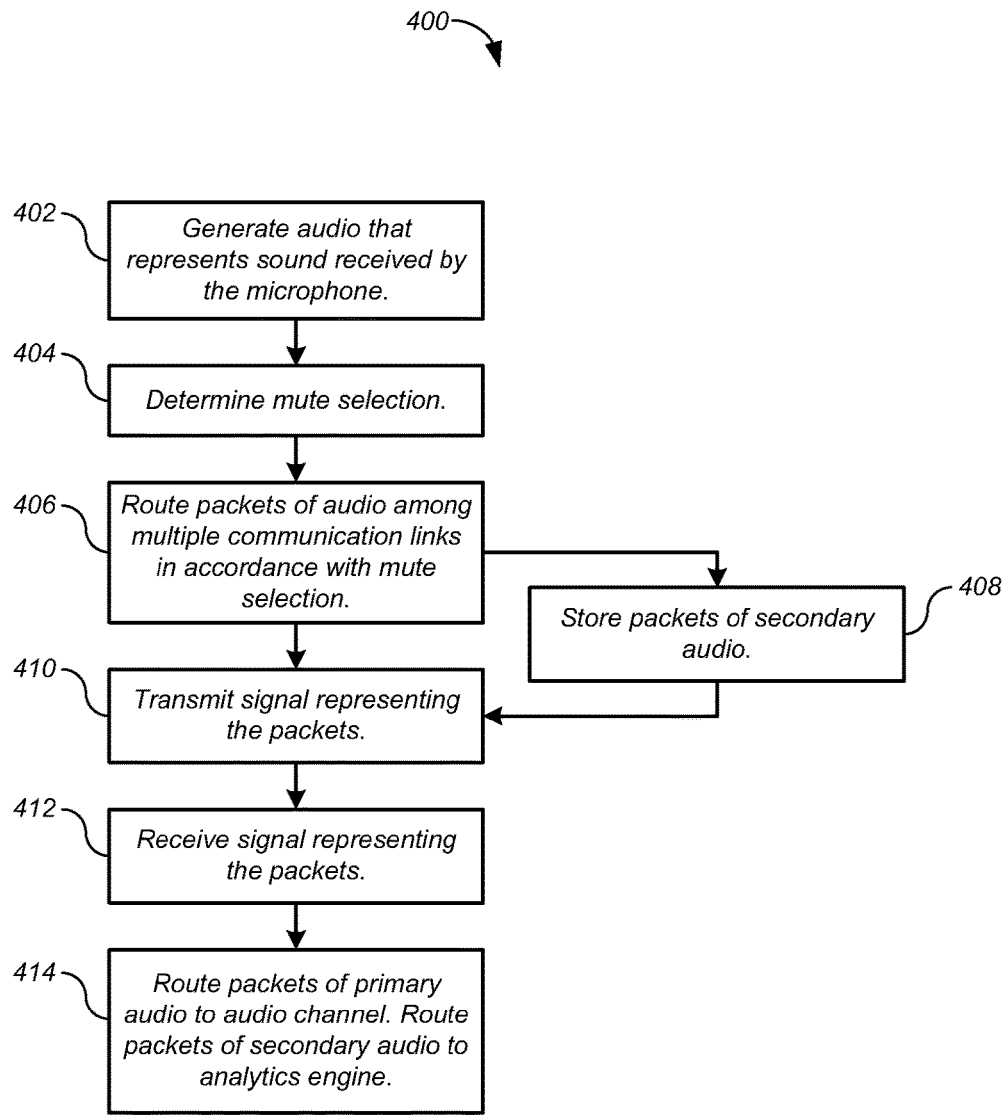
FIG. 4 shows a process for the call center audio system of FIG. 3 according to one embodiment.

FIG. 4 shows a process 400 for the call center audio system 300 of FIG. 3 according to one embodiment. Although in the described embodiments the elements of process 400 are presented in one arrangement, other embodiments may feature other arrangements. For example, in various embodiments, some or all of the elements of process 400 can be executed in a different order, concurrently, and the like. Also some elements of process 400 may not be performed, and may not be executed immediately after each other. In addition, some or all of the elements of process 400 can be performed automatically, that is, without human intervention.

Referring to FIG. 4, at 402, the microphone 308 may generate audio that represents sound received by the microphone 308. The processor 312 may process the audio. An analog-to-digital converter within the processor may convert the audio to digital audio. The processor 312 may packetize the digital audio. The mute control 310 may be operated by the agent to select either a microphone open selection or a microphone muted selection. The selection may be communicated to the processor 312 by a mute signal 328. At 404, the processor 312 may determine the selection based on the mute signal 328.

The processor 312 may identify the audio produced during the microphone open selection as primary audio, and may identify the audio produced during the microphone muted selection as secondary audio. In the present embodiment, the processor 312 may identify the audio by routing the primary audio to one link, and routing the secondary audio to another link. At 406, the processor 312 may route the packets of digital audio among multiple communication links in accordance with the mute signal 328. For example, the processor 312 may route the packets of primary audio to an audio link, and may route the packets of secondary audio to a data link. The audio link may be a Bluetooth Synchronous Connection Oriented (SCO) link. The data link may be a Bluetooth Asynchronous Connection-Less (ACL) link. However, other wireless protocols and links may be used.

At 408, the memory 324 may store the packets of the secondary audio before transmission to the host 304. In such embodiments, the data link need not be open continuously. At 410, the transceiver 314 of the headset 302 transmits one or more signals representing the packets over the wireless channel 306.

At 412, the transceiver 316 of the host 304 may receive the signal representing the packets over the wireless channel 306. At 414, the transceiver 316 may pass the packets according to the communication links. In particular, the transceiver 316 may route the packets of primary audio to the audio channel 320, and may route the packets of secondary audio to the analytics engine 322 for analysis. In some embodiments, the transceiver 316 may also route some or all of the packets of primary audio to the analytics engine 322 for analysis.

Figure 5:
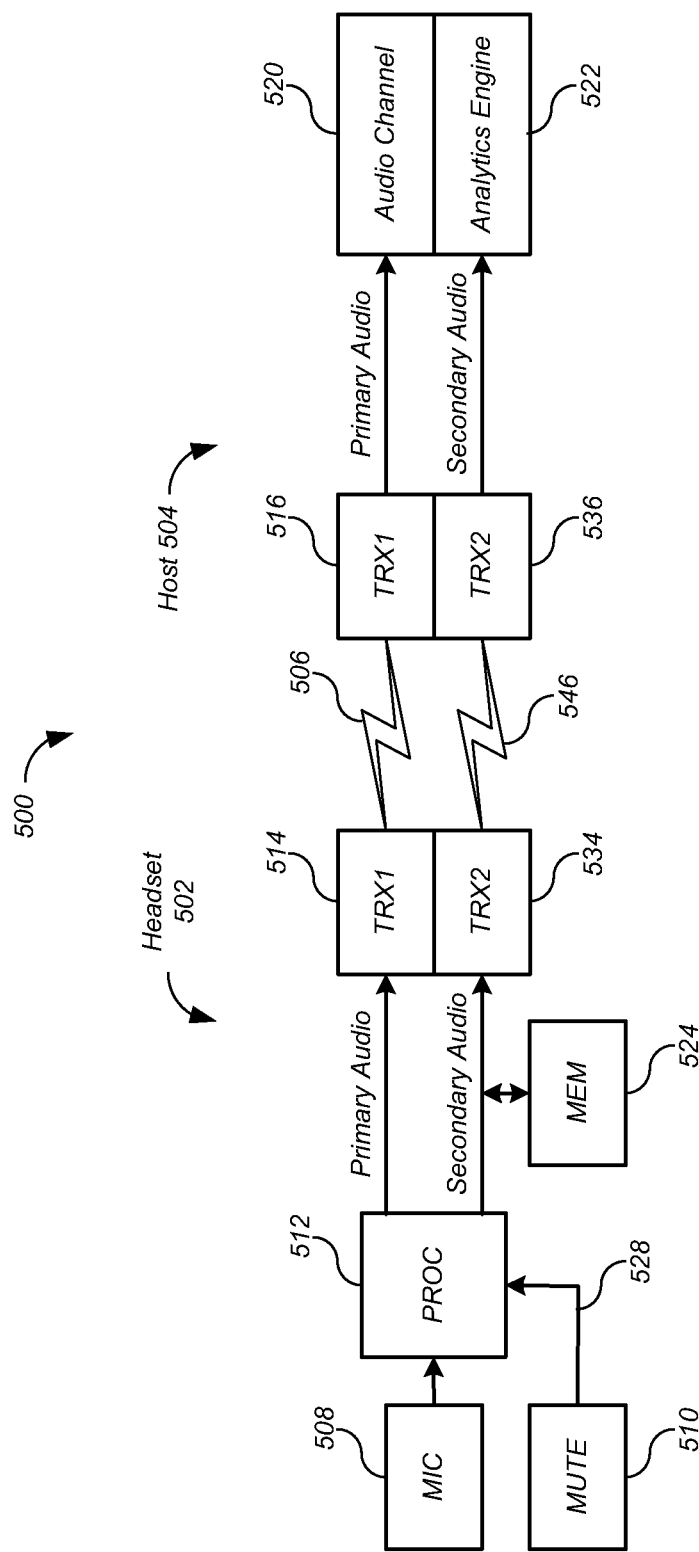
FIG. 5 shows elements of a call center audio system according to an embodiment where the primary and secondary audio are distinguished using different communication protocols.

FIG. 5 shows elements of a call center audio system 500 according to an embodiment where the primary and secondary audio are distinguished using different communication protocols. Although in the described embodiment elements of the call center audio system 500 are presented in one arrangement, other embodiments may feature other arrangements. For example, elements of the call center audio system 500 may be implemented in hardware, software, or combinations thereof. As another example, various elements of the call center audio system 500 may be implemented as one or more digital signal processors.

Referring to FIG. 5, the call center audio system 500 may include a headset 502 in communication with a host 504 over wireless channels 506 and 546. The headset 502 may include a microphone (MIC) 508, a mute control (MUTE) 510, a processor (PROC) 512, a memory 524, transceivers (TRX) 514 and 534. The host 504 may include transceivers (TRX) 516 and 536, an audio channel 520, and an analytics engine 522. While in the described embodiments, the analytics engine 522 may be part of the host 504, in other embodiments, the analytics engine 522 may not be part of the host 504, and may be located outside the call center.

The mute control 510 may select either a microphone open selection or a microphone muted selection. The mute control 510 may be user-operable, automatic, or both. A user-operable mute control 510 may be implemented as a button, slide switch, or the like. An automatic mute control 510 may automatically select the microphone open selection when donned, and may automatically select the microphone muted selection when doffed.

The processor 512 may include an analog-to-digital converter, a digital signal processor, a packetizer, and the like. The wireless channels 506 and 546 may employ different wireless protocols, for example such as Bluetooth and Wi-Fi, respectively. However, any protocol may be used, for example such as Digital Enhanced Cordless Telecommunications (DECT), or the like. The audio channel 520 may be any audio channel suitable for passing the packets of primary audio to a remote party. The secondary audio may be routed directly to the host 504, or via another device such as a smart phone or computer.

Figure 6:
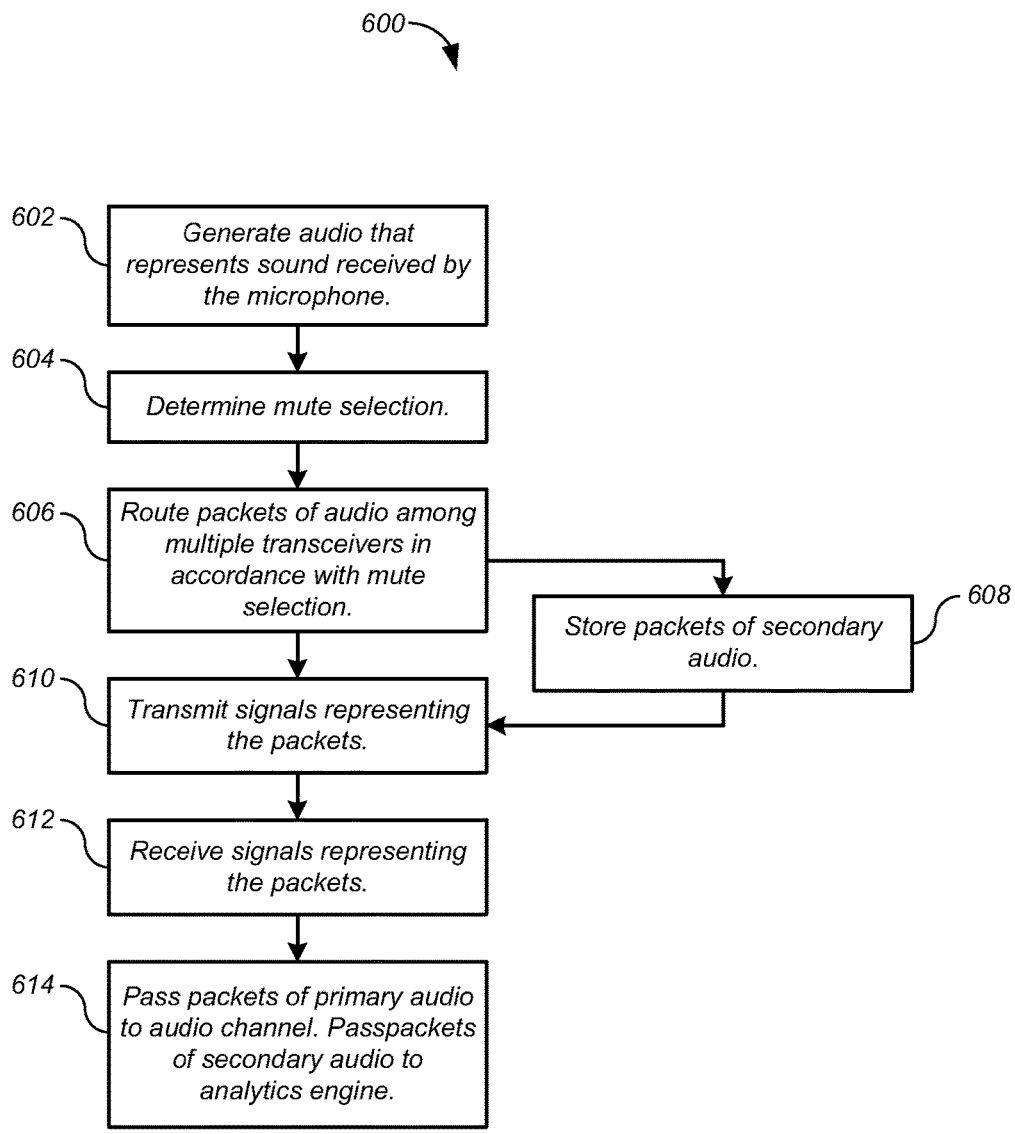
FIG. 6 shows a process for the call center audio system of FIG. 5 according to one embodiment.

FIG. 6 shows a process 600 for the call center audio system 500 of FIG. 5 according to one embodiment. Although in the described embodiments the elements of process 600 are presented in one arrangement, other embodiments may feature other arrangements. For example, in various embodiments, some or all of the elements of process 600 can be executed in a different order, concurrently, and the like. Also some elements of process 600 may not be performed, and may not be executed immediately after each other. In addition, some or all of the elements of process 600 can be performed automatically, that is, without human intervention.

Referring to FIG. 6, at 602, the microphone 508 may generate audio that represents sound received by the microphone 508. The processor 512 may process the audio. An analog-to-digital converter within the processor may convert the audio to digital audio. The processor 512 may packetize the digital audio. The mute control 510 may be operated by the agent to select either a microphone open selection or a microphone muted selection. The selection may be communicated to the processor 512 by a mute signal 528. At 604, the processor 512 may determine the selection based on the mute signal 528.

The processor 512 may identify the audio produced during the microphone open selection as primary audio, and may identify the audio produced during the microphone muted selection as secondary audio. In the present embodiment, the processor 512 may identify the audio by routing the primary audio to one transceiver, and routing the secondary audio to another transceiver. At 606, the processor 512 may route the packets of digital audio among multiple transceivers 514, 534 in accordance with the mute signal 528. For example, the processor 512 may route the packets of primary audio to one transceiver 514, and may route the packets of secondary audio to another transceiver 534.

At 608, the memory 524 may store the packets of the secondary audio before transmission to the host 504. In such embodiments, the data link need not be open continuously. At 610, the transceivers 514, 534 of the headset 502 transmit signals representing the packets over the respective wireless channel 506, 546.

At 612, the transceivers 516, 536 of the host 504 may receive the signals representing the packets over the respective wireless channels 506, 546. At 612, the transceiver 516 may pass the packets of primary audio to the audio channel 520, and the transceiver 536 may pass the packets of secondary audio to the analytics engine 522 for analysis. In some embodiments, the transceiver 516 may also route some or all of the packets of primary audio to the analytics engine 522 for analysis.

The analytics engines 122, 322, 522 described above may perform any sort of analysis on the secondary audio. The analytics engines 122, 322, 522 may identify coughs and sneezes in the secondary audio, keeping metrics as a potential indicator of illness of individual agents and groups of agents. The analytics engines 122, 322, 522 may detect questions, for example based on intonation, voice recognition, and the like, keeping metrics as a possible indicator of need for training of individual agents or groups of agents. The analytics engines 122, 322, 522 may monitor agent's speech with mute on or off and make decisions on content, keeping metrics as indicators of time spent on work communications and personal communications. In all cases, a supervisor may be alerted when a metric threshold is exceeded, making it unnecessary for a supervisor to personally monitor calls or observe agents.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. An apparatus for audio communication between a local and a remote party, comprising:
    a microphone configured to produce audio comprising speech or sounds produced by the local party;
    a mute control configured to select a microphone open selection or a microphone muted selection;
    a processor configured to identify the audio produced during the microphone open selection as primary audio, and to identify the audio produced during the microphone muted selection as secondary audio; and
    a transceiver configured to transmit the primary audio to a remote audio channel for passing to the remote party and to transmit the secondary audio to an analytics engine for analysis, the analytics engine determining, in use, metrics based on characteristics of the secondary audio and alerting a supervisor when a metric threshold is exceeded.

2. The apparatus of claim 1, wherein:
    the transceiver is further configured to transmit the primary audio over a first link, and to transmit the secondary audio over a second link.

3. The apparatus of claim 2, wherein:
the first link is an audio link; and
the second link is a data link.

4. The apparatus of claim 3, wherein:
the first link is a Bluetooth Synchronous Connection Oriented (SCO) link; and
the secondary link is a Bluetooth Asynchronous Connection-Less (ACL) link.

5. The apparatus of claim 1, wherein the transceiver comprises:
a first transceiver configured to transmit the primary audio according to a first protocol; and
a second transceiver configured to transmit the secondary audio according to a second protocol.

6. The apparatus of claim 1, further comprising:
a memory configured to store the secondary audio prior to the transceiver transmitting the secondary audio.

7. The apparatus of claim 1, wherein:
the processor is further configured to packetize the primary audio and the secondary audio, and to mark at least one of (i) packets of the primary audio and (ii) packets of the secondary audio.

8. The apparatus of claim 1, further comprising:
a headset.

9. A method for audio communication between a local party and a remote party, comprising:
producing audio responsive to speech or sounds produced by the local party;
determining a selection of a mute control configured to select a microphone open selection or a microphone muted selection;
identifying the audio produced during the microphone open selection as primary audio;
identifying the audio produced during the microphone muted selection as secondary audio;
transmitting the primary audio to a remote audio channel for passing to the remote party;
transmitting the secondary audio to an analytics engine for analysis;
determining, by the analytics engine, metrics based on characteristics of the secondary audio; and
alerting a supervisor when a metric threshold is exceeded.

10. The method of claim 9, further comprising:
transmitting the primary audio over a first link; and
transmitting the secondary audio over a second link.

11. The method of claim 9, further comprising:
transmitting the primary audio according to a first protocol; and
transmitting the secondary audio according to a second protocol.

12. The method of claim 9, further comprising:
packetizing the primary audio and the secondary audio; and
marking at least one of (i) packets of the primary audio and (ii) packets of the secondary audio.

13. An apparatus for audio communication between a local and a remote party, comprising:
a receiver configured to receive audio produced by a headset, the audio comprising speech or sounds produced by the remote party, wherein the headset has a mute control configured to select a microphone open selection or a microphone muted selection, and wherein the audio includes primary audio and secondary audio, wherein the primary audio is generated by a microphone of the headset during a microphone open selection, and wherein the secondary audio is generated by the microphone of the headset during the microphone muted selection;
a switch configured to pass the primary audio and the secondary audio, the switch in use passing the primary audio to an audio communications channel for transmission to the remote party; and
an analytics engine, the analytics engine in use receiving the secondary audio from the switch, monitoring the secondary audio for call metrics as indicators and providing an alert to a supervisor if a particular call metric is exceeded.

14. The apparatus of claim 13, wherein:
the switch is further configured to pass the primary audio to the analytics engine.

15. The apparatus of claim 13, wherein:
the receiver is further configured to receive the primary audio over a first link, and to receive the secondary audio over a second link.

16. The apparatus of claim 15, wherein:
the first link is an audio link; and
the secondary link is a data link.

17. The apparatus of claim 16, wherein:
the first link is a Bluetooth Synchronous Connection Oriented (SCO) link; and
the secondary link is a Bluetooth Asynchronous Connection-Less (ACL) link.

18. The apparatus of claim 13, wherein the receiver comprises:
a first receiver configured to receive the primary audio according to a first protocol; and
a second receiver configured to receive the secondary audio according to a second protocol.

19. The apparatus of claim 13, wherein:
the audio comprises packets of the primary audio and packets of the secondary audio;
at least one of (i) the packets of the primary audio and (ii) the packets of the secondary audio include marks; and
the switch is further configured to distinguish the (i) the packets of the primary audio and (ii) the packets of the secondary audio based on the marks.

* * * * *